(12) United States Patent
Birek et al.

(10) Patent No.: US 11,884,181 B2
(45) Date of Patent: *Jan. 30, 2024

(54) DETERMINING A MINIMUM STATE OF CHARGE FOR AN ENERGY STORAGE MEANS OF A VEHICLE

(71) Applicant: JAGUAR LAND ROVER LIMITED, Coventry (GB)

(72) Inventors: Lech Andrzej Birek, Warwickshire (GB); James Aggiss, Warwickshire (GB); Krzysztof Kobylinski, Warwickshire (GB); Prasun Chokshi, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 165 days.

This patent is subject to a terminal disclaimer.

(21) Appl. No.: 17/450,540

(22) Filed: Oct. 11, 2021

(65) Prior Publication Data

US 2022/0024347 A1 Jan. 27, 2022

Related U.S. Application Data

(63) Continuation of application No. 16/182,118, filed on Nov. 6, 2018, now Pat. No. 11,142,089.

(30) Foreign Application Priority Data

Nov. 13, 2017 (GB) ..................................... 1718717

(51) Int. Cl.
*B60L 58/13* (2019.01)
*B60L 53/14* (2019.01)
(52) U.S. Cl.
CPC .............. *B60L 58/13* (2019.02); *B60L 53/14* (2019.02)

(58) Field of Classification Search
CPC ...... B60L 58/13; B60L 53/14; B60L 2240/60; B60L 2240/80; B60L 53/305;
(Continued)

(56) References Cited

U.S. PATENT DOCUMENTS 8,718,844 B2* 5/2014 Krause ................. B60W 20/12
320/137
10,534,089 B2* 1/2020 Annapureddy .... G01C 21/3676
(Continued)

FOREIGN PATENT DOCUMENTS

DE 102015113264 A1 2/2016
DE 102016124109 A1 6/2017
EP 2657062 A1 10/2013

OTHER PUBLICATIONS

Great Britain Intellectual Property Office, Combined Search and Examination Report under Sections 17 and 18(3) Issued in Application No. GB1718717.0, dated May 15, 2018, 5 pages.

*Primary Examiner* — Thomas Ingram
(74) *Attorney, Agent, or Firm* — McCoy Russell LLP (57) ABSTRACT

A method for determining a minimum state of charge for an energy storage means of a vehicle can include: determining a routine of use of charge of the energy storage means; determining a user requirement for future driving of the vehicle; predicting a reduction in the state of charge of the energy storage means associated with the user requirement in dependence on the determined routine; determining a minimum state of charge for the energy storage means for enabling the user requirement to be satisfied in dependence on the predicted reduction; and providing an output to the user indicative of a time requirement for increasing the state of charge of the energy storage means to a value at or above the minimum state of charge.

19 Claims, 3 Drawing Sheets

(58) Field of Classification Search
CPC .. B60L 53/68; B60L 2250/12; B60L 2250/16; B60L 2260/54; B60L 53/31; Y02T 10/70; Y02T 10/7072; Y02T 10/72; Y02T 90/12; Y02T 90/14; Y02T 90/16; Y02T 90/167
See application file for complete search history.

(56) References Cited

U.S. PATENT DOCUMENTS

| | | | |
|---|---|---|---|
| 2011/0074350 A1 | 3/2011 | Kocher | |
| 2012/0101755 A1* | 4/2012 | Hirasawa | B60L 53/11 702/63 |
| 2012/0309455 A1* | 12/2012 | Klose | B60L 53/68 455/557 |
| 2013/0179061 A1* | 7/2013 | Gadh | B60L 53/305 701/1 |
| 2014/0006137 A1* | 1/2014 | Melen | G06Q 10/1093 705/14.35 |
| 2014/0033696 A1* | 2/2014 | Thoms | F04B 49/22 60/413 |
| 2014/0217976 A1* | 8/2014 | Mcgrath | B60L 15/2045 320/109 |
| 2014/0336965 A1* | 11/2014 | Mori | H02J 7/0013 702/63 |
| 2016/0052397 A1* | 2/2016 | Meyer | B60L 58/12 701/123 |
| 2016/0079787 A1* | 3/2016 | Yechieli | H02J 3/14 320/138 |
| 2017/0026131 A1* | 1/2017 | Orcutt | G02B 6/2773 |
| 2017/0030728 A1* | 2/2017 | Baglino | G01C 21/3697 |
| 2017/0043674 A1* | 2/2017 | DeBoer, III | B60L 53/63 |
| 2017/0120762 A1* | 5/2017 | Zettel | B60L 7/14 |
| 2017/0176195 A1* | 6/2017 | Rajagopalan | B60L 58/12 |
| 2017/0261331 A1* | 9/2017 | Shimizu | B60L 53/67 |

* cited by examiner

DETERMINING A MINIMUM STATE OF CHARGE FOR AN ENERGY STORAGE MEANS OF A VEHICLE

CROSS REFERENCE TO RELATED APPLICATIONS

The present application is a continuation of U.S. Non-Provisional patent application Ser. No. 16/182,118, entitled "DETERMINING A MINIMUM STATE OF CHARGE FOR AN ENERGY STORAGE MEANS OF A VEHICLE", and filed on Nov. 6, 2018. U.S. Non-Provisional patent application Ser. No. 16/182,118 claims priority to Great Britain Patent Application No. 1718717.0 filed Nov. 13, 2017. The entire contents of each of the abovementioned applications are hereby incorporated by reference in their entirety for all purposes.

TECHNICAL FIELD

The present disclosure relates to determining a minimum state of charge for an energy storage means of a vehicle. The present disclosure further relates to determining a minimum state of charge for an energy storage means of an electric vehicle.

Aspects of the disclosure relate to a method, a controller, a vehicle system, a vehicle and a computer program.

BACKGROUND

It is known for a vehicle (e.g. electric vehicle) to comprise an energy storage means (e.g. traction battery) which takes several hours to be fully charged from a depleted state.

Some electric vehicles have traction batteries that provide relatively low vehicle ranges as compared to internal combustion engine (ICE) powered vehicles, and can only charge at a relatively slow rate, taking several hours to fully charge. The charging infrastructure in some areas is scarce compared to petrol/gasoline or diesel fueling infrastructure. These issues can create range anxiety among electric vehicle users, compounded by a strong incentive to only charge at home or at work rather than in the middle of a journey, for example.

One issue with such vehicle is that a user stranded at an inconvenient location such as a service station with insufficient charge for achieving a goal, may not know how long they will need to charge their vehicle for in order to provide sufficient charge. Consequently, they may wait longer than is strictly required while their vehicle is fully charged.

It is therefore an aim of an embodiment/embodiments of the present disclosure to overcome or at least partially mitigate problems associated with the prior art.

SUMMARY

According to an aspect of the present disclosure, there is provided a method for determining a minimum state of charge for an energy storage means of a vehicle, the method comprising: determining a routine of use of charge of the energy storage means; determining a user requirement for future driving of the vehicle; predicting a reduction in the state of charge of the energy storage means associated with the user requirement in dependence on the determined routine; determining a minimum state of charge for the energy storage means for enabling the user requirement to be satisfied in dependence on the predicted reduction; and providing an output to the user indicative of a time requirement for increasing the state of charge of the energy storage means to a value at or above the minimum state of charge.

This may advantageously result in reducing range anxiety, because the method learns the users personalized routine energy needs, to inform the user how long the vehicle will need to charge for, as a minimum, in order to satisfy the user's driving requirements.

In some examples, the user requirement defines a time period and/or distance of future driving of the vehicle for which the energy storage means must not be in a charge-depleted state. In some examples, the user requirement defines one or more of: a location (e.g. destination); a distance; and a time period. In some examples, the method comprises determining a rate of charge associated with a charger for the energy storage means, and determining the time requirement in dependence on the determined rate of charge.

This may advantageously result in a greater degree of accuracy for determining the user's energy needs.

In some examples, the time requirement is indicative of a time at which or how long until the state of charge of the energy storage means is expected to be at the value. In some examples, the time requirement is indicative of when the state of charge of the energy storage means is expected to transition from being below the value to being at the value. In some examples, the method comprises: charging the energy storage means to the value, in dependence on receiving a user confirmation input.

This may advantageously result in the user being provided with personalized information indicating a minimum charging time for the vehicle.

In some examples, the method comprises determining a second user requirement for future driving of the vehicle, and for the second user requirement: predicting a reduction in the state of charge of the energy storage means associated with the second user requirement in dependence on the determined routine; determining a second minimum state of charge for the energy storage means for enabling the second user requirement to be satisfied in dependence on the predicted reduction; and providing a second output to the user indicative of a time required for increasing the state of charge of the energy storage means to a value at or above the second minimum state of charge, wherein the output and the second output are provided together and are each user-selectable, enabling charging of the energy storage means to the corresponding value to be performed when selected. In some examples, the method comprises providing a required state of charge output prompting the user to input a value of a required state of charge of the energy storage means, wherein the required state of charge output and the output are provided together and are each user-selectable, enabling charging of the energy storage means to the corresponding value to be performed when selected.

It will be appreciated that a vehicle traction battery, or other energy storage means, may be charged or recharged by being electrically coupled to a charging station. This may be achieved by either the vehicle in which the battery is installed, or the battery itself, being plugged into the charging station using a suitable electrical cable, or by being electrically coupled via an inductive charging circuit as are both known in the art.

This provides the advantage of presenting the user with personalised pre-charging options, enabling the user to select a charging option, and therefore charging time, that best matches the user's intentions.

In some examples, the output is provided while the vehicle is plugged in or otherwise coupled to a charging station. In some examples, the output is provided in dependence on detection of the vehicle being plugged in or otherwise coupled to a charging station. In some examples, the output is provided in response to a determination that the predicted reduction subtracted from a current state of charge of the energy storage means indicates that the energy storage means would be in a charge-depleted state.

This provides the advantage that the user is prompted to charge their vehicle when appropriate. Additionally, a user relying on this prompting will avoid charging the battery unnecessarily, saving cost, time and extending the battery service life.

In some examples, the output comprises a post-charging message indicating that the state of charge of the energy storage means is at the value. In some examples, the output comprises a post-charging message indicating that the state of charge of the energy storage means has transitioned from being below the value to being at the value.

This provides the advantage of reducing unnecessary waiting on the part of the user.

In some examples, the routine is determined using measurements of the state of charge of the energy storage means recorded with respect to a cyclic calendar-based time interval.

This provides the advantage of a greater degree of accuracy for determining the user's energy needs, because the user of the vehicle is mostly likely to follow a cyclic calendar-based driving routine, e.g. similar commuting patterns from week to week.

According to a further aspect of the disclosure there is provided a method for determining a minimum charge for an electric or hybrid electric vehicle, the method comprising: determining a routine of electrical discharge for driving the vehicle under electric power; determining a destination for the vehicle; predicting expected electrical discharge for driving the vehicle under electric power for reaching the destination from a current location of the vehicle in dependence on the routine; and while the vehicle has insufficient charge to reach the destination, causing, at least in part, an output to be provided to the user dependent upon a minimum charge for enabling the vehicle to be provided with enough charge to reach the destination assuming the predicted expected electrical discharge.

According to a further aspect of the disclosure there is provided a method for determining a minimum state of charge for an energy storage means of a vehicle, the method comprising: determining a routine of use of charge of the energy storage means; determining a user requirement for future driving of the vehicle; predicting a reduction in the state of charge of the energy storage means associated with the user requirement in dependence on the determined routine; and determining a minimum state of charge for the energy storage means for enabling the user requirement to be satisfied in dependence on the predicted reduction.

According to another aspect of the disclosure there is provided a controller comprising means for carrying out any one or more of the methods described herein. The means may comprise: at least one electronic processor; and at least one electronic memory device electrically coupled to the electronic processor and having instructions stored therein, the at least one electronic memory device and the instructions configured to, with the at least one electronic processor, cause a vehicle system at least to perform any one or more of the methods described herein.

According to an aspect of the disclosure there is provided a controller for determining a charging requirement for an energy storage means of a vehicle, the controller comprising:
input means for receiving data indicative of a use of charge of the energy storage means;
processing means configured to:
determine a routine of use of charge of the energy storage means;
determine a user requirement for future driving of the vehicle;
predict a reduction in the state of charge of the energy storage means associated with the user requirement in dependence on the determined routine;
determine a minimum state of charge for the energy storage means for enabling the user requirement to be satisfied in dependence on the predicted reduction; and
output means for providing an output to the user indicative of a time requirement for increasing the state of charge of the energy storage means to a value at or above the determined minimum state of charge. The input means may comprise an input device. The processing means may comprise at least one electronic processor. The output means may comprise an output device.

According to a further aspect of the disclosure there is provided a vehicle system comprising the controller according to any preceding aspect of the disclosure, and at least one output device, wherein the output device is configured to receive the provided output, and to present the output to a user.

According to a further aspect of the present disclosure there is provided a vehicle comprising the controller or the vehicle system according to any preceding aspect of the disclosure.

According to a further aspect of the present disclosure there is provided a computer program that, when run on at least one electronic processor, causes a controller according to any preceding aspect of the disclosure to perform any one or more of the methods described herein.

Within the scope of this application it is expressly intended that the various aspects, embodiments, examples and alternatives set out in the preceding paragraphs and/or in the following description and drawings, such as the individual features thereof, may be taken independently or in any combination. That is, all embodiments and/or features of any embodiment can be combined in any way and/or combination, unless such features are incompatible.

BRIEF DESCRIPTION OF THE FIGURES

One or more embodiments of the disclosure will now be described, by way of example only, with reference to the accompanying drawings, in which.

DETAILED DESCRIPTION

Figure 1:
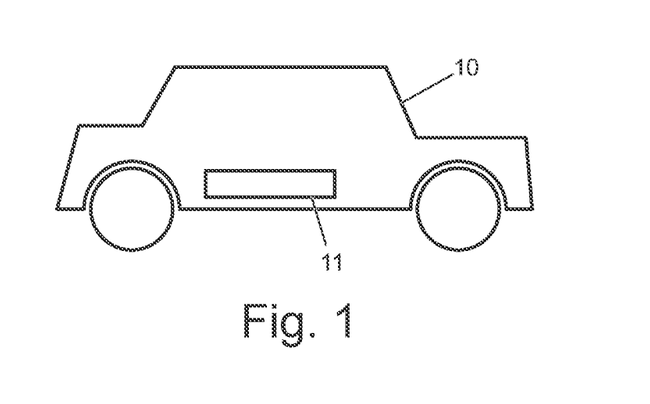
FIG. 1 illustrates an example of a vehicle.

FIG. 1 illustrates an example of a vehicle 10 in which embodiments of the disclosure can be implemented. In some, but not necessarily all examples, the vehicle 10 is a passenger vehicle, also referred to as a passenger car or as an automobile. Passenger vehicles generally have kerb weights of less than 5000 kg. In other examples, embodiments of the disclosure can be implemented for other applications, such as industrial vehicles, air or marine vehicles.

The vehicle 10 of FIG. 1 comprises energy storage means 11 and a traction motor (not shown). The motor is configured to convert energy stored within the energy storage means 11 into energy for providing tractive force for propelling the vehicle 10. In some, but not necessarily all examples the energy storage means 11 is a traction battery ('battery' herein), and the motor is an electric motor. The vehicle 10 may be an electric vehicle, i.e. a hybrid electric vehicle or an all-electric vehicle.

In some, but not necessarily all use cases based on the following disclosure there is provided a self-learning electric vehicle 10 feature which is designed to help a user when they find themselves in a situation with insufficient charge in their vehicle battery 11. A human-machine interface output may provide several user-selectable options for enabling manual inputting of a requirement for future driving. The options may include: 1) giving the user enough change for 'n' typical days of driving, where 'n' is a variable and the user can set 'n' to specify whether they want enough charge to only complete today or the next three typical days, for example; 2) enough charge to travel 'x' typical units of distance (e.g. miles) in their vehicle, wherein 'x' can be set by the user to a desired distance; 3) enough charge to reach a user-selected location (e.g. destination); and 4) charging the battery 11 to 'y' % state of charge (SoC), wherein y can be set by the user. The feature determines a user's requirement based on user selection of an option. Based on a learnt routine, the feature provides an output informing the user that they will need to charge their vehicle 10 for a minimum of one hour to be able to complete their typical Monday driving, for example.

Figure 2:
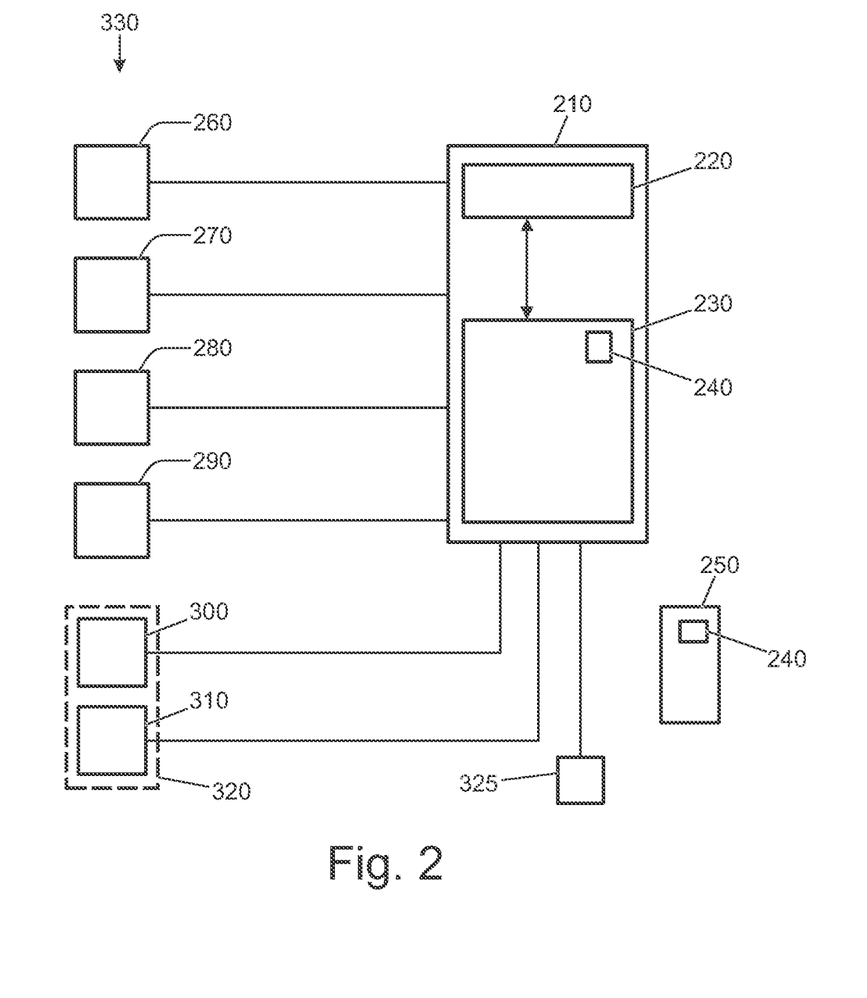
FIG. 2 illustrates an example of a controller and an example of a vehicle system.

FIG. 2 illustrates an example controller 210 and an example vehicle system 330, configured to enable various aspects and embodiments of the disclosure to be performed. It would be appreciated that other arrangements from that of FIG. 2 are possible.

The vehicle system 330 comprises a plurality of subsystems and monitors, each of which is operably coupled with the controller 210. In some examples, monitors may be implemented as control logic within the controller 210. Example subsystems and monitors, illustrated in FIG. 2, include:

A state of charge monitor 260, for providing data indicative of a current state of charge of the battery 11. The state of charge monitor 260 or the controller 210 may be configured to determine a history of the state of charge of the battery 11. This functionality could be embedded within a control module integrated or associated with the battery 11, for example.

An optional key-on/key-off monitor 270, for providing data indicative of whether the vehicle 10 is currently in a key-on or in a key-off state. This functionality could be embedded within a powertrain control unit, for example. In accordance with the ordinary definitions of key-on and key-off, a vehicle 10 entering a key-on state means that a user has operated their vehicle key such that the vehicle 10 is operable to produce tractive force in response to depression of its accelerator pedal or other suitable user interface means, such as a twist-grip. A vehicle 10 entering a key-off state means that a user has operated their vehicle key such that the vehicle 10 is unable to produce tractive force in response to depression of its accelerator pedal.

An optional user-selectable subsystem usage monitor 280, for providing data indicative of which user-selectable energy-consuming subsystems are in use and of the rate of energy consumption of each user-selectable subsystem. Examples of monitored user-selectable subsystems include an air conditioning system, an infotainment system, a vehicle interior lighting system, etc. This functionality could be embedded within a control unit receiving information from one or more power consumption sensors associated with each of the user-selectable subsystems, for example.

An optional navigation system 290, for providing data indicative of one or more of: a current geographical location of the vehicle 10; route information; points of interest such as charging locations at which charging stations are located, etc. The navigation system 290 may comprise a Global Positioning System (GPS) or the like. The data indicative of charging locations may be augmented with metadata indicating properties of the charging station, such as a charge rate or compatibility information. The controller 210 could be configured to retrieve the metadata from one or more remote computing means, such as an external server, in dependence on data from the navigation system 290.

An output device 300. In some examples, the output device 300 is configured to present an output to a user of the vehicle 10. The output device 300 may be an audio output device and/or a visual output device. In other examples, the output device 300 may not be part of the vehicle system 330 and may instead be a portable user device such as a mobile telephone, a so-called 'smart' watch, or similar portable media devices, able to communicate with the controller 210 of the vehicle 10. This enables a portable user device to present the output to the user, even if the user is remote from the vehicle 10.

An optional input device 310 (e.g. button, touchscreen) for enabling a user to make inputs in response to user-input prompts presented by the output device 300. The input and output devices may together form a human-machine interface 320.

The vehicle system 330 may comprise any one or more of the above subsystems, and other subsystems not in the above list operably coupled with the controller 210. The controller 210 is configured to receive the respective data from and/or transmit commands to the subsystems of the vehicle system 330. In some examples, the controller 210 is embodied within the vehicle 10 as part of the vehicle system. In other examples, the controller 210 is remote from the vehicle 10. The data can be exchanged one or more vehicle buses, such as via a Controller Area Network (CAN) bus, and/or via an interface for vehicle-external communication (e.g. wireless interface).

For purposes of this disclosure, it is to be understood that controller(s) described herein can each comprise a control unit or computational device having one or more electronic processors. See for example FIG. 2 which shows a control unit having an electronic processor 220; and at least one electronic memory device 230 electrically coupled to the electronic processor 220 and having instructions 240 stored therein. A vehicle 10 and/or a system thereof (such as the controller 210) may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Aspects and embodiments of the disclosure can alternatively be embodied as computer program code 240 stored on a computer readable storage medium 250, as also illustrated in FIG. 2.

Figure 3:
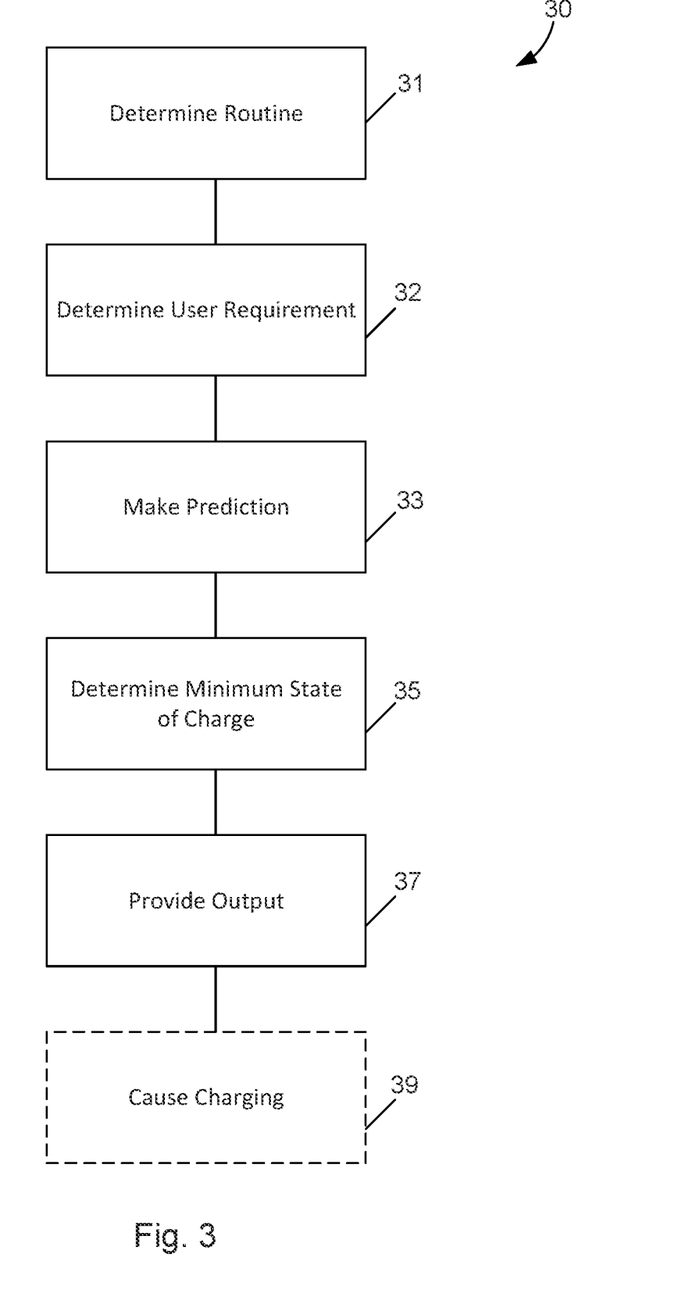
FIG. 3 illustrates an example of a method.

FIG. 3 illustrates a method 30 for determining a charging requirement for the battery 11 of the vehicle 10 described in relation to FIG. 1. The controller 210 of FIG. 2 may be configured to perform the method 30.

The method 30 comprises, at block 31, determining a routine of use of charge of the battery 11.

In some examples, determining a routine at block 31 comprises continually collecting data indicative of a current state of charge (SoC) of the battery 11 to determine a history of SoC. The controller 210 could be configured to obtain such data from the state of charge monitor 260, for example.

A "routine" refers to an established course of procedure, therefore the data collection begins significantly earlier than a most-recent charging event of the battery 11. For example, the data collection may be 'cradle-to-grave' data collection, i.e. may operate continually over the whole lifespan of the vehicle 10.

A "routine" more specifically also refers to a repetitive procedure, therefore in one example determining the routine at block 31 may comprise continuously collecting the data throughout a cyclic calendar-based routine. Data collection may be performed in accordance with known machine learning techniques such as nearest neighbour regression and/or ensemble learning, for example, although other machine learning techniques are envisaged. Each cycle for which the data is collected increases the performance of any predictions made based on the determined routine, because the accuracy of an expected use of SoC metric (e.g. average) and of an associated error/confidence score (e.g. variance) increases.

Regarding the time interval of the cyclic calendar-based routine, different users operate their vehicles according to different routines. A 'weekly' routine may be appropriate to those users who have similar driving patterns from one week to the next. A user whose driving habits are determined by a fortnightly shift pattern for their place of work may operate on a 'fortnightly' routine. Other time intervals include 'daily' or 'monthly'. In some examples, the state of charge data with respect to a weekly routine may be at day-level granularity.

In some, but not necessarily all examples, the determined routine is, in effect, a model of SoC over time from which predictions can be made indefinitely into the future with a certain level of confidence, assuming of course that the conditions affecting the learning of the routine do not radically change in the future (e.g. user changes job, moves house etc.).

In some, but not necessarily all examples, determining the routine at block 31 further comprises determining a routine of usage of user-selectable energy-consuming vehicle subsystems, for example using data from the user-selectable subsystem usage monitor 280. This would enable the discrimination of energy consumption purely for producing tractive force from energy consumption for other purposes. This increases predictive performance of any predictive model based on the routine, because a prediction of SoC can then account for the likelihood of use of user-selectable subsystems.

In some, but not necessarily all examples, determining the routine at block 31 further comprises determining a routine of distance travelled by the vehicle 10, in dependence on continual monitoring of distance travelled by the vehicle 10. This historic distance data enables an internal prediction to be made of expected distance to be travelled in a given day.

In some, but not necessarily all examples, algorithms for the routine determination are trainable. For example, the routine determination comprises weighting SoC data according to age, so that the average is computed based on weighted SoC data. Older SoC data may be given a lower weight. This ensures that the determined routine quickly adjusts to changes in the user's routine, for example when the user moves house, and even to changes of season, for example accounting for increased use of air conditioning.

In some, but not necessarily all examples, the controller 210 is configured to determine whether the vehicle 10 is being driven out-of-routine. This determination can be made, for example, by making an internal prediction of expected distance to be travelled in a given day, using the historic distance data, and an internal prediction of expected SoC to be consumed in a given day. If on a given day, the user travels significantly more than they are expected to travel, then the output device 300 prompts the user to confirm whether they are driving out-of-routine. If the user confirms this with an input via the input device 310, the data for that day is discarded. Discarded data is not taken into account in updating the routine.

At block 32, the method 30 comprises determining a user requirement for future driving of the vehicle.

The user requirement may define a time period and/or distance of future driving of the vehicle 10 for which the energy storage means 11 must not be in a charge-depleted state. This represents a constraint forbidding the battery 11 from reaching its charge-depleted state during a defined time period and/or distance of future driving of the vehicle. The user requirement may define a location (e.g. destination) to which the vehicle 10 is to be driven. Alternatively, the user requirement may define a distance by which the vehicle 10 is to be driven, such as 80 miles. Alternatively, the user requirement may define a time for which the vehicle 10 is to be driven, such as "today". The time may be at day-level granularity.

If the user requirement represents distance, this distance may be calculated from a location or a destination input by a user.

In some, but not necessarily all examples, the controller 210 uses data from the navigation system 290 to determine a distance, a location and/or a route to the location.

In some examples, the user requirement is determined in response to a manual user selection of a charging option, as will be described later in relation to FIG. 4. The user requirement may for example comprise a manually entered location, a distance or a time requirement.

Additionally or alternatively, the user requirement can be determined before any user selection of a charging option is made. In other words the user requirement could be determined predictively, in advance of any manual user selection of a charging option such as that shown in FIG. 4. Such a prediction could be dependent on information recorded in the routine or in conjunction with determining the routine, such as a location (e.g. destination), a distance or a time requirement. As a result of this prediction, it will be possible to display to the user a number of charging options that are likely to be of interest to the user, such as 'Get home', or 'Fill up for the week'. Each option may be displayed concurrently with a time requirement for that option as will be determined in block 37 below. Once the user has selected an option, the method may loop back to block 32 to the extent that the requirement indicated by their selection differs from a prediction and therefore requires a recalculation of the minimum charging time.

At block 33, the method comprises predicting a reduction in the state of charge of the battery 11 associated with the user requirement in dependence on the determined routine.

In one example implementation, block 33 determines how much of the battery's charge 11 will be consumed by the time the time period and/or distance of future driving has been completed, assuming the vehicle is driven according to the determined routine throughout the defined time period and/or distance of future driving. This could be regarded as a change in SoC, or a 'delta'.

For example, if the time period and/or distance of future driving relates to a time, block 33 may determine how much charge is expected to be consumed when the required time (e.g. 'today') has elapsed, based on the determined routine. For example, block 33 may reveal a usage of 10 kWh for today.

If the time period and/or distance of future driving relates to a location or distance, block 33 may determine how much charge is needed for driving the distance needed in dependence on the determined routine. In some examples this relies on an estimation of charge usage per-unit distance from the routine. Usage per-unit distance may in some examples vary in the routine in dependence on time. To give an example, usage may be 2 kWh per mile in the summer and 1 kWh per mile in the winter depending on ambient and road conditions.

At block 35, the method comprises determining a minimum SoC for the battery 11 for enabling the user requirement to be satisfied in dependence on the predicted reduction of block 33.

In one implementation, block 35 comprises determining a current SoC, subtracting from the current SoC the delta determined at block 33 to determine the resulting SoC, and determining whether the resulting SoC is below a threshold defining a charge-depleted state of the battery 11.

A charge-depleted state may refer to SoC being below a reserve level of SoC (e.g. 25%), or being insufficient for driving a lower threshold of distance (e.g. 50 miles) or for a next journey. The battery 11 requires charging when the battery 11 is in its charge-depleted state. In the charge-depleted state the battery 11 may still be usable for providing tractive torque, but a warning may be output to the user via an output device (e.g. 300) indicative of the charge-depleted state.

If the resulting SoC is expected to fall below the threshold by (or before) the end of the defined time period and/or distance of future driving, then the current SoC is below the minimum SoC needed to complete the defined time period and/or distance and the vehicle 10 should be charged first. Otherwise, the current SoC is enough and the vehicle 10 will not need to be charged first.

The minimum SoC is no more than required for ensuring that the SoC remains above the threshold by (and optionally before) the end of the defined time period and/or distance of future driving.

In some, but not necessarily all examples, the threshold for a depleted state is adjustable. For example, the controller 210 could be configured to set the reserve level in dependence on confidence/error (e.g. variance) metrics of the routine data. For example, if the user drives to different locations every Saturday, the variance will be high for Saturday. The reserve level could be set to 20% for Saturdays. If the user drives to the same locations at the same times every Friday, a reserve level of 10% may be appropriate for Friday.

At block 37, the method 30 comprises providing an output to the user indicative of a time requirement for increasing the state of charge of the energy storage means to a value at (optionally above) the minimum state of charge. If the controller 210 carrying out the method 30 does not itself comprise the output device 300, block 37 may consist of transmitting information to the output device 300 to cause, at least in part, the presentation of the above-mentioned output to the user.

The user can then see, from looking at the output device 300 or other display device displaying the output (and/or listening to an audio device, etc.), how long they should charge their vehicle 10 for at a minimum.

In some, but not necessarily all examples block 37 or blocks 32 to 37, is performed in response to a determination that the current SoC is insufficient, i.e. the predicted reduction subtracted from a current SoC of the battery 11 indicates a charge-depleted state of the energy storage means. In some examples block 37 or blocks 32 to 37, may be performed while the vehicle 10 is plugged in or otherwise coupled to a charging station, for example in response to detection of the vehicle 10 being plugged in or otherwise coupled to a charging station. Such a detection may indicate an electrical coupling of the vehicle to a charging station.

In an example implementation, the output time requirement is indicative of a time at which or how long until the state of charge of the energy storage means 11 is expected to be at the value. In an example implementation, the output time requirement represents how long the vehicle will need to be plugged in or otherwise coupled to an energy source and charging for the current SoC to transition to the minimum SoC. The controller 210 could be configured to determine the time requirement in dependence on determining how much charge is required to increase charge from the current SoC to the required minimum SoC, and determining a rate of charging associated with a charger for the energy storage means.

In some examples, the controller 210 is configured to determine the rate of charge using deterministic properties by accessing information indicating the rate of charge for a given battery 11 or charger of the battery 11. The deterministic properties could be obtained from a control module integrated with the battery 11, from an external control module implemented in a charging station, from an electronic memory device of the controller 210, or the like. In other examples, the controller 210 is configured to determine the rate of charge using non-deterministic properties, for example by interrogating the routine determined at block 31, and determining the typical rate of charge in dependence on past SoC with respect to time. For example, the routine indicates that an 80% SoC increase requires 8 hours of charging, so the rate is 10% per hour.

In some, but not necessarily all examples, the above-mentioned output of block 37 can be presented on an output device 300 or as part of a system of output devices that present additional useful information to the user.

Figure 4:
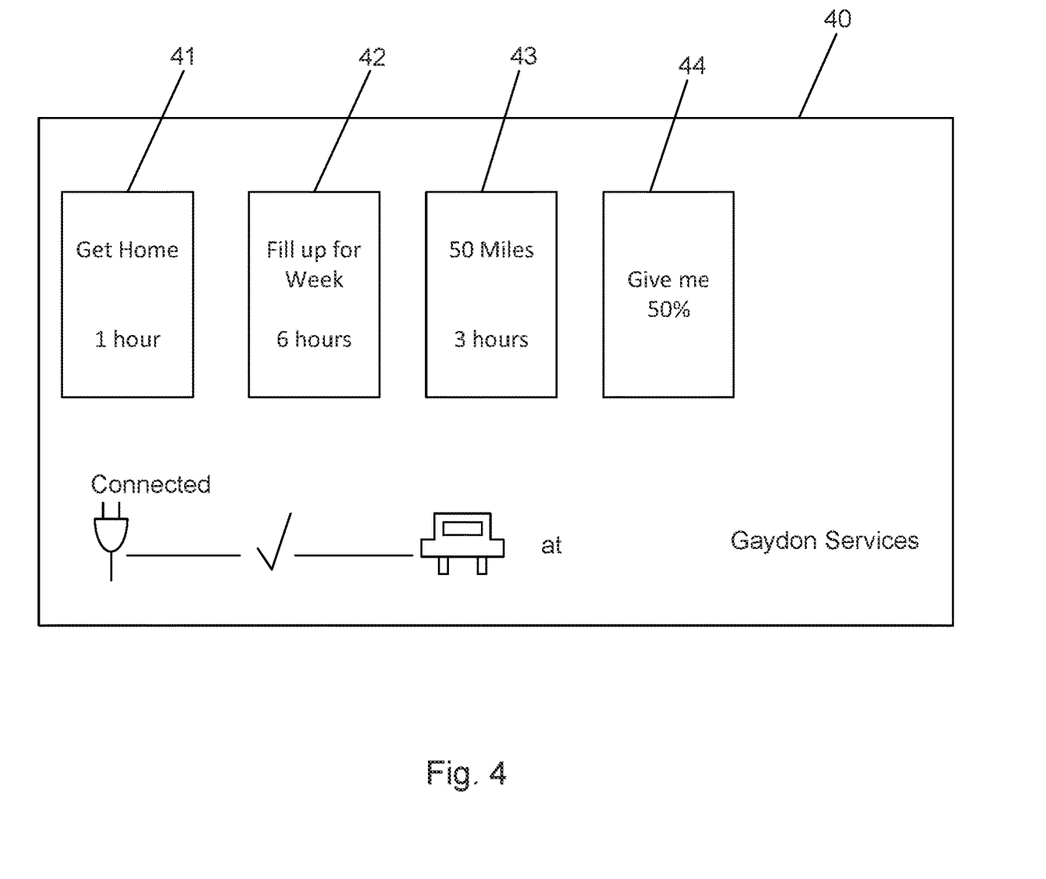
FIG. 4 illustrates an example of a user interface.

FIG. 4 shows an illustrative example of a user interface 40 that presents the output and other outputs as pre-charging messages. In FIG. 4 but not necessarily in all examples, the user interface 40 is a human machine interface 320 that presents to the user a plurality of options for charging their vehicle battery 11. The options are individually user-selectable via the input device 310, enabling the user to select a charging option. In some examples, the user interface 40 is displayed in response to detection of the vehicle 10 being plugged in or otherwise coupled to a charging station. In some, but not necessarily all examples, performing block 37 comprises displaying the user interface 40.

A first displayed option 41 is an output calculated from blocks 31-37, based on a user requirement for driving to the destination 'home'. A time requirement of one hour is displayed in conjunction with the first option, indicating that one hour of charging is needed for getting home.

A second displayed option 42 is a further output calculated from blocks 31-37, based on a user requirement for a week's worth of charge. A time requirement of six hours is displayed in conjunction with the second option, indicating that six hours of charging is needed for a week's worth of charge. The user may be able to set a variable 'n' indicating how many days of charge are needed, ranging from 'today' to a week or beyond.

A third displayed option 43 is a further output calculated from blocks 31-37, based on a user requirement for 50 miles (approximately 80 km) worth of charge. A time requirement of three hours is displayed in conjunction with the third option, indicating that three hours of charging is needed for 50 miles worth of charge. The user may be able to set a variable 'x' indicating how many units of distance (e.g. miles) are needed.

A fourth displayed option 44 is a required state of charge output that provides the user with the option of charging to a user-specified desired SoC, should none of the options calculated from blocks 31-37 be appropriate to the user's current context. Other options based on different (second, third etc.) user requirements may be provided in various examples, not limited to the above options. The user may be able to set a variable 'y' indicating how much SoC is needed.

In some, but not necessarily all examples, the output of block 37 is instead a post-charging message indicating that the SoC of the battery 11 is at the value, i.e. the SoC has transitioned from being below the value to being the value. Such an output is indicative of a time requirement for increasing the state of charge of the energy storage means to a value at or above the minimum state of charge, to the extent that the time requirement is now zero, i.e. the battery 11 now has the minimum SoC for achieving the user requirement for future driving of the vehicle 10.

The output 37 in the form of a post-charging message could represent a prompt for the user to return to their vehicle which is now ready to drive. In some examples, the post-charging message is transmitted via a local and/or wide area network to a portable user device of the user, so that the user can feel free to leave their vehicle 10 during charging and still be able to finish charging at the earliest possible time, due to the prompt.

The method 30 includes an optional block 39 (marked by dashed lines), which occurs after block 37 if the output of block 37 is a pre-charging message, and before block 37 if the output of block 37 is a post-charging message. Block 39 comprises charging of the energy storage means to the value, in dependence on receiving a user confirmation input. If the controller 210 carrying out the method 30 does not itself comprise the means for charging the energy storage means, charging the energy storage means refers to transmitting information to the means for charging the energy storage means to cause, at least in part, the charging to occur.

The user confirmation input may be an input, optionally provided via the human machine interface 320, specifying a charging option such as one of the options described in relation to FIG. 4, or otherwise confirming that the time requirement provided in relation to block 37 is acceptable. If multiple outputs are provided, the input specifies which of those outputs has been selected by the user.

The blocks illustrated in FIG. 3 may represent steps in a method and/or sections of code in the computer program 240. The illustration of a particular order to the blocks does not necessarily imply that there is a required or preferred order for the blocks and the order and arrangement of the block may be varied. Furthermore, it may be possible for some steps to be omitted.

Although embodiments of the present disclosure have been described in the preceding paragraphs with reference to various examples, it should be appreciated that modifications to the examples given can be made without departing from the scope of the disclosure as claimed. For example the energy storage means could be other than a traction battery 11 for an electric vehicle. References to a state of charge/charge could be references to the quantity of energy stored in the energy storage means for conversion into torque for producing tractive force.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method for determining a minimum state of charge for a traction battery of a vehicle, the method comprising:
   a controller determining a routine use of charge of the traction battery, wherein determining the routine use of charge of the traction battery comprises determining a routine usage of user-selectable energy consuming vehicle subsystems;
   the controller determining a user requirement for future driving of the vehicle;
   predicting a reduction in a state of charge of the traction battery associated with the user requirement based at least in part on the determined routine use of charge of the traction battery;
   the controller determining the minimum state of charge for the traction battery for enabling the user requirement to be satisfied based at least in part on the predicted reduction in the state of charge of the traction battery; and the controller providing an output to a user indicative of a time requirement for increasing the state of charge of the traction battery to a value at or above the determined minimum state of charge for the traction battery;

wherein the output is user-selectable, enabling charging of the traction battery to the corresponding value to be performed when selected.

2. The method as claimed in claim 1, wherein determining the routine use of charge of the traction battery comprises discrimination of energy consumption purely for producing tractive force from energy consumption for other purposes.

3. The method as claimed in claim 1, wherein determining the routine use of charge of the traction battery comprises continually collecting data indicative of a current state of charge of the traction battery to determine a history of state of charge of the traction battery.

4. The method as claimed in claim 1, wherein determining the routine use of charge of the traction battery comprises determining a routine of distance travelled by the vehicle based at least in part on continual monitoring of distance travelled by the vehicle.

5. The method as claimed in claim 1, wherein determining the routine use of charge of the traction battery comprises weighting data used to determine the routine use of charge according to age.

6. The method as claimed in claim 1, wherein the controller determines whether the vehicle is being driven out-of-routine, and if the controller determines that the vehicle is being driven out-of-routine, data for that day is discarded.

7. The method as claimed in claim 1, wherein the user requirement defines a time period and/or distance of future driving of the vehicle for which the traction battery must not be in a charge-depleted state.

8. The method as claimed in claim 1, wherein the user requirement defines one or more of: a location; a distance; and a time period.

9. The method as claimed in claim 1, further comprising: charging the traction battery to the value, based at least in part on receiving a user confirmation input.

10. The method as claimed in claim 1, further comprising: the controller providing a required state of charge output prompting the user to input a value of a required state of charge of the traction battery, wherein the required state of charge output and the output are provided together and are each user-selectable, enabling charging of the traction battery to a corresponding value to be performed when selected.

11. The method as claimed in claim 1, further comprising the controller providing the output while the vehicle is plugged in or otherwise coupled to a charging station.

12. The method as claimed in claim 1, wherein the time requirement is indicative of a time at which or how long until the state of charge of the traction battery is expected to be at the value.

13. The method as claimed in claim 1, comprising the controller determining a rate of charge associated with a charger for the traction battery, and the controller determining the time requirement based at least in part on the determined rate of charge associated with the charger for the traction battery.

14. The method as claimed in claim 1, wherein the output comprises a post-charging message indicating that the state of charge of the traction battery is at the value.

15. The method as claimed in claim 1, wherein the routine is determined using measurements of the state of charge of the traction battery recorded with respect to a cyclic calendar-based time interval.

16. A controller comprising:
at least one electronic processor; and
at least one electronic memory device electrically coupled to the at least one electronic processor and storing executable instructions, wherein the at least one electronic memory device and the instructions are configured to, with the at least one electronic processor, cause a vehicle to perform a method for determining a minimum state of charge for a traction battery of the vehicle, the method comprising:
determining a routine use of charge of the traction battery, wherein determining the routine use of charge of the traction battery comprises determining a routine usage of user-selectable energy consuming vehicle subsystems;
determining a user requirement for future driving of the vehicle;
predicting a reduction in a state of charge of the traction battery associated with the user requirement based at least in part on the determined routine use of charge of the traction battery;
determining the minimum state of charge for the traction battery for enabling the user requirement to be satisfied based at least in part on the predicted reduction in the state of charge of the traction battery; and
providing an output to a user indicative of a time requirement for increasing the state of charge of the traction battery to a value at or above the determined minimum state of charge for the traction battery;
wherein the output is user-selectable, enabling charging of the traction battery to the corresponding value to be performed when selected.

17. The controller as claimed in claim 16, wherein the at least one electronic memory device comprises a non-transitory computer readable medium having said instructions stored therein.

18. A vehicle comprising:
a controller, the controller comprising:
at least one electronic processor; and
at least one electronic memory device electrically coupled to the at least one electronic processor and storing executable instructions, wherein the at least one electronic memory device and the instructions are configured to, with the at least one electronic processor, cause a vehicle to perform a method for determining a minimum state of charge for a traction battery of the vehicle, the method comprising:
determining a routine use of charge of the traction battery, wherein determining the routine use of charge of the traction battery comprises determining a routine usage of user-selectable energy consuming vehicle subsystems;
determining a user requirement for future driving of the vehicle;
predicting a reduction in a state of charge of the traction battery associated with the user requirement based at least in part on the determined routine use of charge of the traction battery;
determining the minimum state of charge for the traction battery for enabling the user requirement to be satisfied based at least in part on the predicted reduction in the state of charge of the traction battery; and providing an output to a user indicative of a time requirement for increasing the state of charge of the traction battery to a value at or above the determined minimum state of charge for the traction battery;

wherein the output is user-selectable, enabling charging of the traction battery to the corresponding value to be performed when selected; and wherein the vehicle further comprises:

at least one output device configured to: receive the output and a second output; and present the output and the second output to the user.

19. The vehicle as claimed in claim 18, wherein the at least one electronic memory device comprises a non-transitory computer readable medium having said instructions stored therein.

* * * * *